United States Patent [19]

Sokalski

[11] Patent Number: 4,570,484

[45] Date of Patent: Feb. 18, 1986

[54] LIQUID MEASUREMENT SYSTEM

[75] Inventor: Robert G. Sokalski, Wheaton, Ill.

[73] Assignee: Eaton Corporation, Cleveland, Ohio

[21] Appl. No.: 713,051

[22] Filed: Mar. 18, 1985

[51] Int. Cl.[4] .............................................. G01F 23/14
[52] U.S. Cl. ....................................... 73/301; 73/302;
137/392
[58] Field of Search ......................... 73/299, 301, 302;
137/392

[56] References Cited

U.S. PATENT DOCUMENTS

| | | | |
|---|---|---|---|
| 3,114,381 | 12/1963 | Klose et al. ........................ | 73/299 X |
| 3,640,134 | 2/1972 | Hop .................................... | 73/301 X |
| 3,670,765 | 6/1972 | Haynes ............................... | 137/392 |
| 4,043,193 | 8/1977 | Bailey ................................ | 73/302 X |
| 4,258,745 | 3/1981 | Nicholson ......................... | 73/302 X |

FOREIGN PATENT DOCUMENTS

| | | | |
|---|---|---|---|
| 2032178 | 4/1980 | United Kingdom ..................... | 73/11 |
| 0230447 | 3/1969 | U.S.S.R. ................................ | 73/301 |

Primary Examiner—Daniel M. Yasich
Attorney, Agent, or Firm—C. H. Grace; A. E. Chrow

[57] ABSTRACT

Disclosed is a non-contacting liquid measurement system (60) preferably adapted to provide an averaged measurement in suitable units of measure of liquid (2), such as fuel, in a pressurized or unpressurized tank (4), such as a vehicular fuel tank, having an irregular shape such as irregular shaped bottom (6). The irregularity of bottom (6) results in variations in depth of liquid (2) across tank (4) that are accounted for by disposing a plurality of conduits (10, 12 14) in an array across tank (4) predetermined to provide the accuracy of measurement desired. Conduits (10, 12, 14) have respective ends (16, 18, 20) immersed in liquid (2) as close to bottom (6) as practical and are operable to provide respective liquid pressure signals ($P_1$, $P_2$ and $P_2$) which are collected and averaged in a conduit (22) which delivers the averaged liquid pressure signal for exposure to flexible diaphragm (24) of an electro-magnetic transducer to which is secured a metallic armature having a base portion (25) and a projection (26) that is moved by diaphragm (24) in opposite directions within an electromagnetic field produced by a current carrying conductor (28) coiled about a core (27) and powered by suitable electrical power source (P). Circuitry (30) detects movement of the armature within the electromagnetic field and provides an electrical output signal (32) to an indicator (34) to provide a visual indication of the averaged measurement.

9 Claims, 2 Drawing Figures

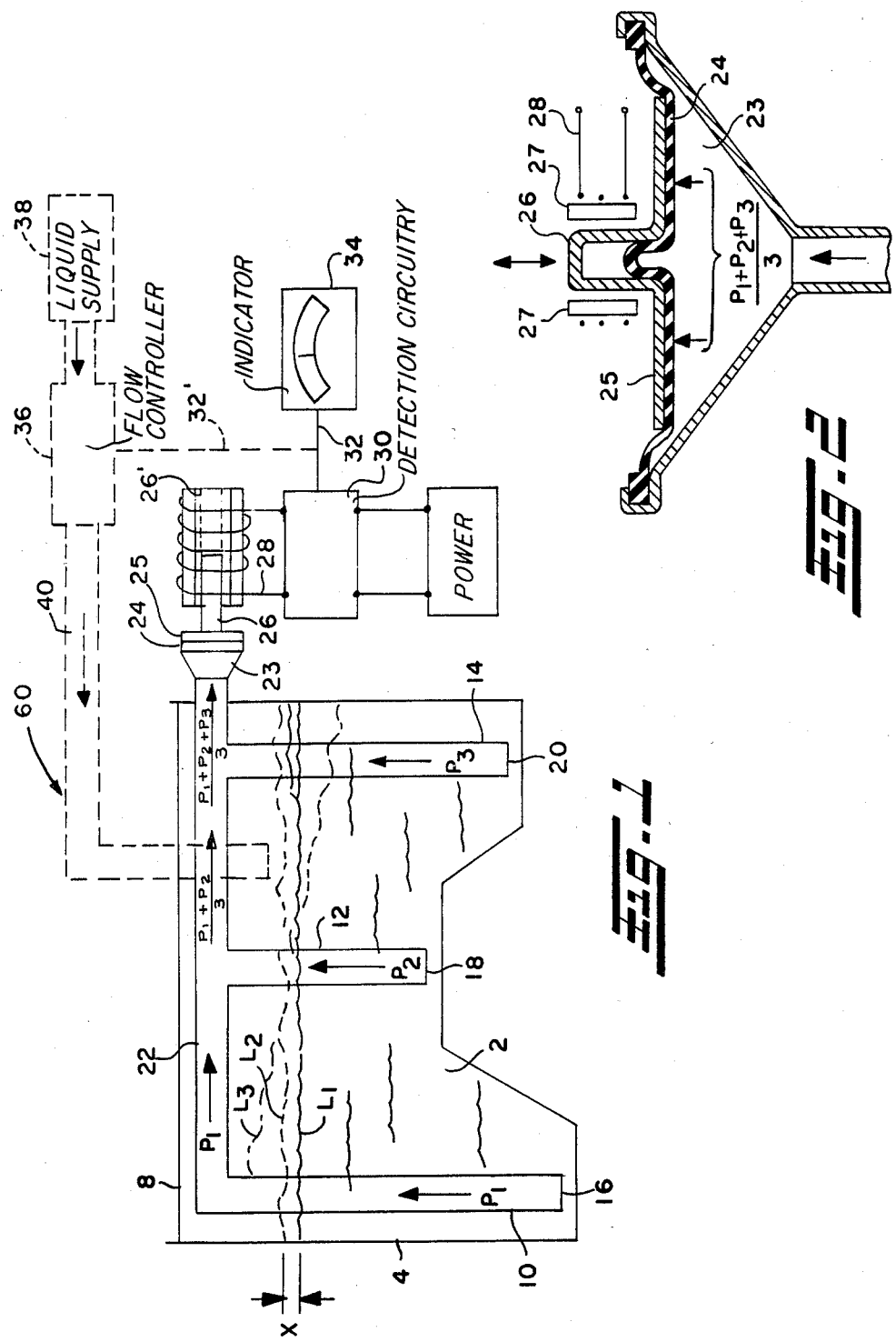

LIQUID MEASUREMENT SYSTEM

INTRODUCTION

This invention relates generally to a measurement system for a liquid within a region of measurement and more particularly to a liquid measurement system adapted to account for irregularities in the shape of the region such as an irregular shaped fuel tank.

BACKGROUND OF THE INVENTION

A wide variety of systems for measuring liquid depth and/or content within a region such as a container or vehicular fuel tank have been developed over the years. Such systems commonly employ vertical displacement of a buoyant or float member disposed on the surface of the liquid in a water tank for example for operating a valve to maintain a constant surface level of liquid within the tank. Such float members have also commonly been linked to a variable resistor such as a potentiometer to provide an electrical output signal that varies with the height of the liquid surface within a tank or the like which, by a variety of means is converted to a visual indicator calibrated to display depth and/or content of the liquid within the region being monitored. Fluid measuring systems employing such float members and potentiometers have heretofore been susceptible to wear, sticking and breakage and thus have been found to present maintenance and accuracy problems.

More recently the effects of imparting a duty cycle or frequency change or phase shift or impedance change to an electrical circuit commonly incorporating an oscillator in response to movement of a core member within an electromagnetic field of a coiled current carrying conductor (generally called eddy current sensors) to variations in level or pressure of a liquid have been used to advantage in eliminating contact wear commonly effecting potentiometers used in such applications in the past.

An example of an eddy current sensor employing circuitry adapted to sense the position of a metallic object with respect to an electromagnetic field and provide either a digital or analog output indicative thereof is disclosed in U.S. Pat. No. 4,112,365, the disclosure of which is included herein by reference. An example of a liquid level monitor and controller employing an eddy current sensor having a core member moveable in response to changes in variations in liquid pressure to correspondingly alter phase of an electrical circuit is disclosed in U.S. Pat. No. 4,201,240, the disclosure of which is incorporated herein by reference. The core member, however, is of standard tubular design and is not provided with means for controlling its movement in response to pressure variations. An example of an eddy current type pressure transducer suitable for use in the system of the present invention utilizing movement of a metallic armature within an electromagnetic field of a coiled current carrying conductor in response to changes in liquid pressure to produce a frequency change in the current which is then converted by means of oscillator and buffer circuitry to provide an indication of fluid height is disclosed in my copending U.S. patent application Ser. No. 676,701 filed Nov. 30, 1984.

All of such eddy current type sensors however have heretofor been employed in systems adapted to monitor liquid surface level or pressure at a single location within a region and are thus unable to provide meaningful information as to averaged content or depth of a liquid within a region having an irregular bottom or sides or both resulting in different liquid depth across the region or, for example, in a fuel tank that is tipped back and forth resulting in almost instantaneous changes in depth of the fuel at all locations except along the rotational axis of the fuel within the tank. Such prior art eddy current type sensors have further featured conventional moveable metallic core members or armatures that have not been provided with means for controlling their movement in the manner desired to provide accurate measurement of content or flow of liquid contained in an irregular shaped region such as a fuel tank even where the measurement is taken at a single location within the region. Further, such prior art eddy current type sensors have not provided differential pressure measurement useful, for example, in providing flow rate of the fluid being monitored.

SUMMARY OF THE INVENTION

Accordingly, it is an object of this invention to provide a system for providing an averaged measurement of depth and/or content and/or flow of a liquid contained within an irregular shaped region.

It is another object of this invention to provide a system for providing an averaged measurement of depth and/or content and/or flow of a liquid contained within an irregular shaped region having variations in the depth of the liquid thereacross that is further provided with means for controlling the average depth and/or content of the liquid within the region.

It is still a further object of this invention to provide a system employing a non-contacting eddy current sensor for providing an averaged measurement of depth and/or content and/or flow of a liquid contained within an irregular shaped region.

It is a more particular object of this invention to provide a system employing a non-contacting eddy current sensor utilizing a metallic armature that can be adapted to provide accurate measurement of content or flow of liquid contained within an irregular shaped region such as a fuel tank even though the surface of the fuel is not at atmospheric pressure.

It is still yet another object of this invention to provide a system employing a non-contacting eddy current sensor for measuring liquid content or flow of a liquid contained in an irregular shaped region that has long service life, low maintenance and is economical to manufacture.

BRIEF DESCRIPTION OF THE DRAWINGS

FIG. 1 shows a partially schematic side elevation view of an embodiment 60 of the liquid measuring system of the invention; and FIG. 2 shows a partial cross-sectional view of an embodiment of an eddy current sensor used in the system of FIG. 1.

DESCRIPTION OF SOME PREFERRED EMBODIMENTS

FIG. 1 shows an embodiment of a system 60 for providing an averaged measurement of liquid depth and/or content over a region having variations in the liquid depth thereacross. The region of measurement in FIG. 1 is tank 4 containing liquid 2 and having an irregular shaped bottom 6. Tank 4 may be provided with a top 8 particularly when tank 4 is a vehicular fuel tank and the liquid is a liquid fuel such as gasoline or diesel fuel. The irregularity of bottom 6 results in variations in the depth of liquid 2 across tank 4 which in turn results in corresponding variations in pressure of liquid 2 near bottom 6 of tank 4 as is well known to those skilled in the art of pressure phenomenon.

Due to the irregularity of bottom 6, calculation of the amount of liquid 2 in tank 4 becomes quite difficult. Variations in the level of liquid 2 in tank 4 such as by increasing surface level "L," of liquid 2 a distance "x" to "$L_2$" or tilting tank 4 to provide a squewed surface level "$L_3$" as shown in FIG. 1 further compounds the difficulty in making an accurate measurement of the liquid content in tank 4 at any given time.

In accordance with the invention, in order to provide a reasonably accurate approximation of the content of liquid 2 in tank 4 at any given time, a plurality of spaced-apart conduits such as conduits 10, 12 and 14 are immersed in liquid 2 in an array predetermined to provide a reasonably accurate measurement of the averaged depth and/or content and/or flow rate of liquid 2 in tank 4 at any given time. Understandably, the greater the number of liquid pressure measurement locations across the region, the closer the averaged measurement approaches actual conditions.

Conduits 10, 12 and 14 are respectively operable to convey a liquid pressure signal therethrough. Although shown in FIG. 1 as entering from the top of tank 4, conduits 10, 12 and 14 may enter tank 4 from any location provided they provide the particular liquid pressure signal desired. Each of conduits 10, 12 and 14 preferably have respective open ends 16, 18 and 20 as near bottom 6 of tank 4 as practical for obtaining the highest degree of accuracy desired in measuring the liquid pressure at their particular respective locations across tank 4. Alternatively, respective conduit ends 16, 18 and 20 may be sealed in favor of openings through the side wall of conduits 10, 12 and 14 near their respective bottoms as is well known to those skilled in the art.

The respective opposite ends of conduits 10, 12 and 14 are joined in sealed fluid pressure communication with pressure tight conduit 22 as shown in FIG. 1. Although shown in the form of an elongate conduit, conduit 22 may for example comprise a pressure tight collector plenum where suitable. Conduits 10, 12, 14 and 22 may be rigid conduits or flexible conduits such as flexible hose when one or the other is preferably for a particular application.

The height of liquid 2 in conduits 10, 12 and 14 compresses gas such as air above the surface level of liquid 2 within the respective conduits to provide respective fluid pressure signals $P_1$, $P_2$ and $P_3$ which are a function of the density of the liquid which may itself be effected by the liquid temperature as is well known to those skilled in the art.

As shown by the arrows, pressure signals $P_1$ and $P_2$ join in conduit 22 at the juncture of conduits 12 and 22 to provide an average pressure signal which is conveyed along conduit 22 until joined by pressure signal $P_3$ at the juncture of conduits 14 and 22 to then provide an average of pressure signals $P_1$, $P_2$ and $P_3$ which is conveyed through conduit 22 for exposure to pressure responsive diaphragm 24 hereinafter described with reference to both FIGS. 1 and 2.

As shown in FIG. 2, the average of pressure signals $P_1$, $P_2$ and $P_3$ exits into a pressure tight enclosed chamber 23 that has one of its sides sealed off by diaphragm 24. Diaphragm 24 is made of a resilient material such as a suitable rubber or elastomeric material and is thus caused to move in opposite directions corresponding to increases and decreases in the average pressure signal in chamber 23.

A metallic armature having a plate portion 25 and a central projecting portion 26 is suitably secured to the back side of diaphragm 24 and operable to move in unison with diaphragm 24 as previously described. Projection 26 is surrounded by an electromagnet coil comprising an inner core 27 about which is wound or coiled a current carrying electrical conductor 28. Electrical current flowing through coiled conductor 28 produces an electromagnet field whose lines of force are intersected by the armature as it moves in opposite directions within core 27 in response to corresponding increases and descreases in the average liquid pressure signal in chamber 23. Intersection of the electromagnetic field induces frequency and other changes in the current flowing through conductor 28 that can be used to advantage in converting the averaged liquid pressure signal in chamber 23 into an electrical output signal for further use as is well known to those skilled in the art of electromagnetic transducers.

As shown in FIG. 1, movement of projection 26 of the armature to its dashed position 26' upon an increase in the average pressure signal deposed to diaphragm 24 produces a frequency shift that is received by electrical circuitry generally referenced as 30 for conversion into an output electrical signal 32.

Circuitry 30 may be of any type including that previously described that is adapted to convert detectable changes such as frequency shift in the current flowing through coiled conductor 28 caused by intersection of an electromagnetic field by a moving armature to provide an electrical output signal 32 indicative of the particular position of the armature with respect to the electromagnetic field at any given time. Such circuitry often includes inductive, capacitive, impedance or oscillator circuitry as well as buffer and counting circuits well known to those skilled in the art. For the purposes of this invention, the combination of core 27, conductor 28 and circuitry 30 adapted to provide a continuous output electrical signal 32 corresponding to the particular position of an armature within the electromagnetic field at any given time is termed a non-contacting "eddy current sensor".

Although armature projection 26 preferably extends into the central opening through core 27 as shown in FIG. 2, it may be positioned at any location within the electromagnetic field produced by current carrying conductor 28 provided movement of the armature causes the electromagnetic field to be intersected in the manner desired to produce a useful continuous electrical output signal 32.

Circuitry 30 is provided with a suitable source "P" of electrical power for causing a suitable alternating electrical current to flow through coiled conductor 28 and for enabling circuitry 30 to provide electrical output signal 32. Output signal 32 is received by suitable indicator means 34 that is adapted to convert signal 32 into meaningful visual information such as the averaged depth and/or content and/or flow rate of liquid 2 in tank 4 at any given time as for example when depth is in inches or feet and content is in gallons or other suitable unit of liquid measure. Where necessary, means may also be included for adjusting signal 32 or its converted value within indicator 32 to account for density changes of liquid 2 as is well known to the those skilled in the art.

Output signal 32 may additionally be utilized such as referenced by 32' as an electrical input signal to a suitable flow controller 36 adapted to provide a flow of liquid 2 to tank 4 as referenced by arrow 40, from a liquid supply source 38 to maintain the surface level of liquid 2 at a desired level. Flow controllers operative to provide liquid or remove liquid in response to the particular value of an electrical signal are well known to those skilled in the art.

The non-contacting eddy current sensor used in conjunction with the liquid measurement system of the invention is able to provide a continuous electrical output signal 32 that is indicative of movement of an armature within an electro-magnetic field in response to changes in the averaged liquid pressure in chamber 23 but which signal may not be linear between successive positions. Accordingly, output signal 32 may be linearized by electrical methods well known to those skilled in the art or by altering the amount of movement of the armature plate caused by a particular change in the averaged liquid pressure signal in chamber 23 exposed to diaphragm 24. As shown in FIG. 2, the plate portion 25 of the armature and diaphragm 24 arerelatively flat resulting in perhaps the greatest movement of armature plate 25 in response to a change in the value of the averaged liquid pressure in chamber 23. Such movement may however not produce a linearized output measurement over a broad movement range of the armature. In order to alter the amount by which the armature moves in response to pressure changes within chamber 2, its configuration can be altered by shaping it as a cone or other configuration to alter the direction force 7 upon the armature produced by the average liquid pressure within chamber 23 in the manner desired to enable indicator 34 to provide an averaged measurement of liquid 2 in tank 4 that is linearized over a desired measurement range.

Although the liquid measuring system of the invention is particularly advantageous for providing an averaged measurement of content and/or depth and/or flow rate of liquid contained within an irregularly shaped region by means of liquid pressure signals provided by a plurality of spaced-apart conduits previously described, the system of the invention is also advantageous for use where there is only a single point of liquid pressure measurement of a liquid contained within an irregularly shaped region due to the combination of measuring the liquid pressure at a predetermined location within the region and altering the shape of the metallic armature of the sensor such that its movement in response to variations of the liquid pressure signal provides the degree of accuracy desired in measuring content and/or depth and/or flow rate of liquid contained within the region.

The liquid measuring system of the invention provides a means of providing a measurement in suitable units of measure of liquid 2 contained in an irregular shaped region such as tank 4 that additionally may be linearized over a desired measurement range. Such measurement includes monitoring changes in liquid pressure over short periods of time to provide incremental pressure differences above to be converted into flow rate.

The system of the invention is particularly useful for providing an averaged measurement in suitable units of liquid measurement of a liquid in a region such as a fuel tank having variations as the depth of the liquid thereacross in the form of an averaged value in suitable units of a liquid measurement that is preferably linearized over the range of measurement that is highly useful in many applications which heretofore relied upon the inaccuracies associated with only a single point of liquid pressure measurement. The system of the invention is particularly advantageous for use in vehicular fuel tank applications for providing a means of observing averaged instantaneous fuel consumption in situations when the vehicle is traveling over rough and/or inclined terrain causing the fuel in the tank to slosh or otherwise assume an inclined or undulated surface condition within the tank rendering single location fuel content measuring devices relatively inaccurate.

I claim:

1. A system for providing an averaged measurement of a liquid contained within an irregular shaped region in suitable units of measurement, said system comprising:

non-contacting movable sensor means at an end of a fluid conduit and providing a continuous electrical output signal in response to variations in an averaged liquid pressure signal received thereby, said sensor means of the type comprising an eddy current transducer operable to provide said electrical output signal in response to movement of a metallic armature within an electromagnetic field of a coiled current carrying conductor in response to movement of a pressure responsive diaphragm at an end of said fluid conduit upon exposure to said liquid pressure variations, indicator means for indicating said averaged liquid measurement, said indicator means operative to receive said sensor means electrical output signal and convert said output signal to said averaged liquid measurement, and a plurality of conduit means operative to convey a liquid pressure signal respectively therethrough, said conduit means having respective ends thereof disposed in said liquid within said region in a spaced-apart array predetermined to provide a plurality of liquid pressure signals accounting for the region shape irregularities, said conduit means having respective opposite ends thereof joined together in fluid pressure communicating relationship with said fluid conduit and operative to combine said plurality of liquid pressure signals to provide said averaged fluid pressure signal for exposure to said diaphragm.

2. A system for providing a measurement of a liquid contained within an irregular shaped region in suitable units of measurement, said system comprising:

a non-contacting movable sensor means at an end of a fluid conduit and providing a continuous electrical output signal in response to variations in at least one liquid pressure signal received thereby, said sensor means of the type comprising an eddy current transducer operable to provide said electrical output signal in response to movement of a metallic armature within an electromagnetic field of a coiled current carrying conductor in response to movement of a pressure responsive diaphragm at an end of said fluid conduit upon exposure to said liquid pressure variations, indicator means for indicating said liquid measurement, said indicator means operative to receive said sensor means electrical output signal and convert said output signal to said liquid measurement, at least one conduit means operative to convey said liquid pressure signal therethrough to the fluid conduit and for exposure to said sensor means diaphragm, said armature having a configuration adapted to control the movement thereof in response to said liquid pressure signal variation and said conduit means disposed in said liquid within said region at a predetermined location such that the combination thereof accounts for shape irregularities in the region to provide an accurate measurement of said liquid within said region in suitable units of measurement.

3. The system of claims 1 or 2 including means for linearizing said sensor electrical output signal for enabling said indicator means to provide a linearized measurement of said liquid within said region.

4. The system of claim 3 wherein said sensor output signal is linearized by said armature having a configuration adapted to linearize movement thereof in response to variations in said liquid pressure signal.

5. The system of claims 1 or 2 wherein said region comprises a vehicular fuel tank and said liquid comprises fuel within said tank.

6. The system of claims 1 or 2 including means for controlling the measurement of said liquid within said region in response to information provided by said sensor output signal.

7. A system for providing an averaged measurement of liquid fuel contained in an irregularly shaped fuel tank in suitable units of measurement, said system comprising:

non-contacting sensor movable means for at an end of a fluid conduit and providing a continuous electrical output signal in response to variations in an averaged fuel pressure signal received thereby, said sensor means of the type comprising an eddy current transducer operable to provide said electrical output signal in response to movement of a metallic armature within an electromagnetic field of a coiled current carrying conductor in response to movement of a pressure responsive diaphragm at an end of said fluid conduit upon exposure to said fuel pressure variations, indicator means for indicating said averaged fuel measurement, said indicator means operative to receive said sensor electrical output signal and convert said output signal to said averaged fuel measurement, and a plurality of conduit means operative to convey a fuel pressure signal respectively therethrough, said conduit means having respective ends thereof disposed in said fuel within said tank in a spaced-apart array predetermined to provide a plurality of fuel pressure signals accounting for irregularities in the shape of said fuel tank, said conduit means having respective opposite ends thereof joined together in fluid pressure communicating relationship with the fluid conduit and operative to combine said plurality of fuel pressure signals to provide said averaged fuel pressure signal for exposure to said diaphragm.

8. The system of claim 7 including means for linearizing said sensor electrical output for enabling said indicator means to provide a linearized measurement of said fuel within said fuel tank.

9. The system of claims 1, 2 or 7 wherein the measurement is flow rate of the liquid.

* * * * *